UNITED STATES PATENT OFFICE.

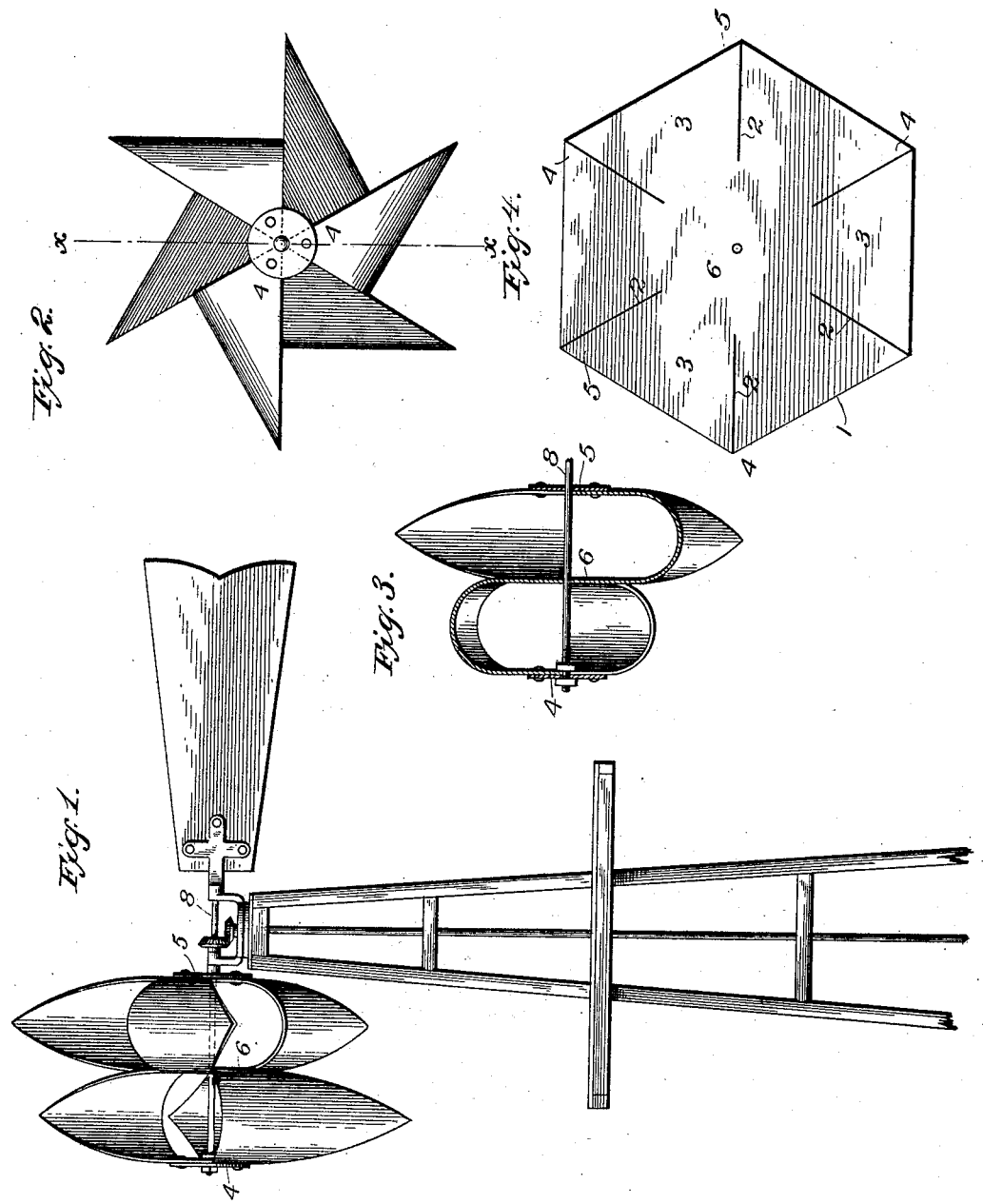

JAMES V. O'CONNOR, OF BROCKTON, MASSACHUSETTS.

PROPELLER.

SPECIFICATION forming part of Letters Patent No. 603,703, dated May 10, 1898.

Application filed July 3, 1897. Serial No. 643,411. (No model.)

*To all whom it may concern:*

Be it known that I, JAMES V. O'CONNOR, of Brockton, in the county of Plymouth and State of Massachusetts, have invented certain new and useful Improvements in Propellers; and I do hereby declare the following to be a full, clear, and exact description of the invention, such as will enable others skilled in the art to which it appertains to make and use the same.

This invention relates to propellers designed to be operated by air, either under pressure or free, water, gas, steam, hydrocarbons, or any other propelling medium to actuate individual or combined mechanisms.

The principle involved in the operation of the device embodies a successive application of a propulsive force at different points at the same time, and continuing the beneficial impact of said force in each instance from one to an adjacent following member before expenditure of its impelling characteristic results. The movement of the propeller is accelerated by bringing into the plane of action alternate members thereof, which is attained by a compound construction of concavo-convex triangular-shaped wings or vanes struck up or bent into form on opposite sides of a common center, and to secure this arrangement a disk of suitable outline is provided and slitted on radial lines a predetermined distance to produce triangular sections, which are turned in reverse directions relatively to the plane of the said disk, and thereby locate the base of each wing in diametrical alinement with the hypotenuse of a contiguous wing. The base of the hypotenuse of each wing is open and the altitude is formed by a curved closed wall, and by the specific location of parts the base opens over the next succeeding hypotenuse, and the generator of motion is thus caused to pass from one wing to the other. Furthermore, the alternate arrangement of the wings on opposite sides of the center insures an exposure at all times of a wing on one side or the other in a receptive plane, and renders the device exceptionally sensitive and quickly responsive to the least amount of applied force, as well as obviates any tendency toward the obstructing intervention of dead-center. It will therefore be observed that the object of this invention is to concentrate natural or artificially-applied power within the smallest possible space on receptive surfaces arranged in parallel, horizontal, or vertical planes, in accordance with the position of the device, and in alternation to create a momentum, which is transmitted to a common center and imparted thence to a driving-shaft or analogous mechanism.

In the accompanying drawings, Figure 1 is an elevation of a part of a windmill-frame, showing the improved propeller applied thereto. Fig. 2 is an elevation of the propeller. Fig. 3 is a section on the line $x$ $x$, Fig. 2. Fig. 4 is a plan view of the blank from which the propeller is formed.

The drawings illustrate a disclosure of the structural composition of the invention, subject to variations and changes as well as the addition of attendant devices incidental to transmitting mechanisms, and though Fig. 1 shows the device applied to a windmill it is merely to display one mode of application, and it will be understood that the device is adapted for use with or forms the primary factor of hydraulic, steam, or gas motors, and on navigating vessels, such as boats, air-ships, and flying-machines.

Referring to the drawings, wherein similar numerals of reference are employed to indicate corresponding parts in the several views, the numeral 1 designates a blank in the form of a hexagonal polygon; but this contour is not necessarily essential, as the sides may be increased or decreased so long as a regular number of wings or vanes are formed to equally balance the propeller. From the angles of the sides slits 2 are formed and extended inwardly about two-thirds the distance between said angles and the center. These slits form substantially triangular sections 3 with the center of the blank as the common apex of all, and the wings or vanes are formed by first bending, for example, the corner 4 of one section over the reverse side and to the center. The corner 5 is then brought inwardly over the center of the obverse side, and so on until all the corners are similarly arranged. The single central web or partition 6 supports the oppositely-situated wings or vanes, and when the corners are turned inwardly they are secured to central bearing-disks 7, through which and the center of the web or partition 6 a shaft 8 extends and is connected for rotation by the revolution of the propeller.

The thickness, quality, nature, and dimensions of the disk 1 may be varied in accordance with the application and the propeller may be positioned vertically, horizontally, or obliquely. In either position the opposite wings or vanes operate in two parallel planes and are conducive to the participation of each in a united operation by having an open base of one directing the propulsive medium into the open face of the next succeeding one.

In the use of the device on an air-ship or flying-machine it can serve not only as the means of propelling, but also for elevating purposes and steering. By a rapid rotation of the shaft through any suitable means the propeller can be made exceedingly efficient as a fan or ventilator. Many other uses and applications of the invention may be made, and it is obviously apparent that by increasing the number of wings or vanes a more sensitive as well as more powerful operation will ensue.

In operation each wing or vane arriving at the proper angle receives the momentum-generator or propulsive medium against the curved altitudinous walls and from thence is delivered through the open bases to the next succeeding wing or vane and from thence to a certain degree to the next wing. Furthermore, when the open bases arrive at the angle of reception no resistance is offered to the movement of the propeller by the absence of a closed surface. This operation is carried on in alternation at opposite sides and becomes continuous in each set of wings with a resultant rapidity of movement.

Having thus described the invention, what is claimed as new is—

1. A propeller having oppositely-situated triangular wings or vanes arranged in parallel planes and supported by a common center, the one side and base of each wing or vane being open, and the bases positioned to direct the propulsive medium into the open side of the next succeeding wing, substantially as described.

2. A propeller having wings or vanes supported by a common central web or partition and arranged in parallel planes in alternation on opposite sides of said partition, substantially as described.

3. In a propeller, a blank consisting of a disk slitted inwardly toward the center to form triangular sections and having the corners in alternation bent in opposite directions and carried over the reverse and obverse sides of the blank to form triangular wings or vanes arranged in parallel pairs and each of which has an open side and base, and a curved wall, substantially as described.

4. A propeller having a common center, consisting of a web or partition and wings or vanes on opposite sides of said center arranged in alternation, and each series separate from the other in parallel planes, substantially as described.

In testimony whereof I have signed this specification in the presence of two subscribing witnesses.

JAMES V. O'CONNOR.

Witnesses:
JAMES W. GRAVES,
JOHN A. BARBOUR.